United States Patent
Hayman et al.

(10) Patent No.: US 9,797,512 B2
(45) Date of Patent: Oct. 24, 2017

(54) PISTON PIN WITH OUTER MEMBER AND CORE AND METHOD OF MANUFACTURING A PISTON PIN

(71) Applicant: GM GLOBAL TECHNOLOGY OPERATIONS LLC, Detroit, MI (US)

(72) Inventors: Alan W. Hayman, Romeo, MI (US); Rodney E. Baker, Fenton, MI (US); Dale E. Murrish, Troy, MI (US); Amit Kumar, Rochester Hills, MI (US); Balakrishna Chinta, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 98 days.

(21) Appl. No.: 14/923,597

(22) Filed: Oct. 27, 2015

(65) Prior Publication Data

US 2017/0114898 A1  Apr. 27, 2017

(51) Int. Cl.
*F16J 1/16* (2006.01)
*F02F 3/00* (2006.01)
*F04B 39/00* (2006.01)

(52) U.S. Cl.
CPC . *F16J 1/16* (2013.01); *F02F 3/00* (2013.01); *F04B 39/0005* (2013.01)

(58) Field of Classification Search
CPC .......................................................... F16J 1/16
See application file for complete search history.

(56) References Cited

U.S. PATENT DOCUMENTS

| | | | | |
|---|---|---|---|---|
| 3,702,092 A | * | 11/1972 | Zollner | F16J 1/16 403/154 |
| 4,640,641 A | * | 2/1987 | Edelmayer | F16J 1/16 29/522.1 |
| 5,327,813 A | * | 7/1994 | DeBell | F16J 1/16 123/193.6 |
| 6,364,565 B1 | * | 4/2002 | Billimack | F16J 1/18 403/150 |
| 2010/0154628 A1 | * | 6/2010 | Porta | F16J 1/16 92/187 |
| 2010/0232870 A1 | * | 9/2010 | Golya | F16J 1/16 403/150 |

FOREIGN PATENT DOCUMENTS

JP         63019472 A  *  1/1988

OTHER PUBLICATIONS

Marco Maurizi, Roland Lochmann, Mahle GmbH "'Composite Pin' A New Light Weight Piston Pin Concept", SAE Congress 2015, Apr. 21-23, 2015, Stuttgart, Germany, 26 pages.

* cited by examiner

*Primary Examiner* — F. Daniel Lopez
(74) *Attorney, Agent, or Firm* — Quinn IP Law

(57) ABSTRACT

An assembly such as a piston assembly for an engine includes a piston pin that has an outer member and a core. The outer member has a cavity extending lengthwise therethrough. The cavity has a first volume. The core is fit to the outer member in the cavity, and has a second volume less than the first volume. For example, the second volume may be less than the first volume because the core has an opening, because the core is shorter in length than the cavity, or both. A method of manufacturing a piston pin includes providing an outer member having a first density and a first length, creating a cavity that extends lengthwise through the outer member, providing a core having a second density and a second length, and inserting the core into the cavity of the outer member.

22 Claims, 9 Drawing Sheets

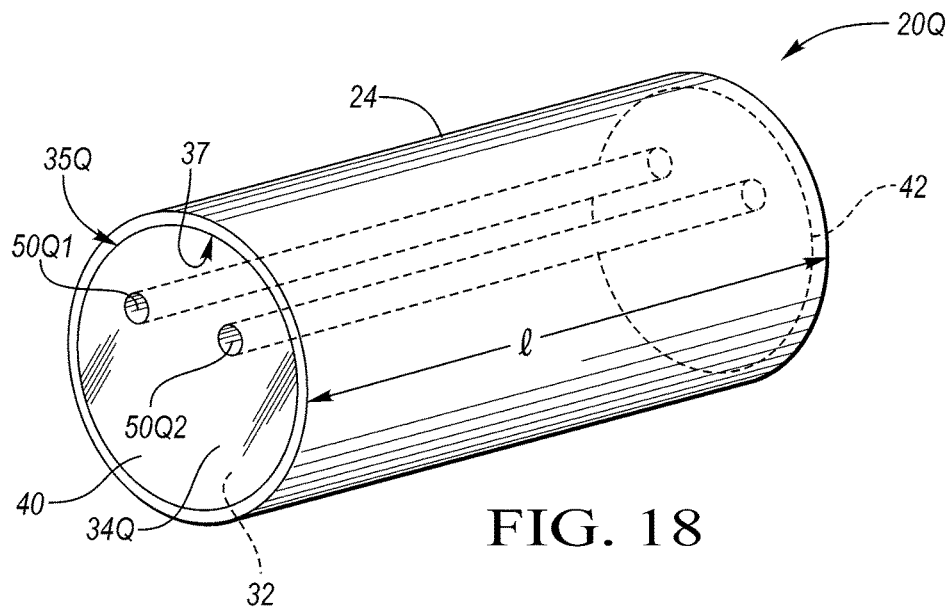
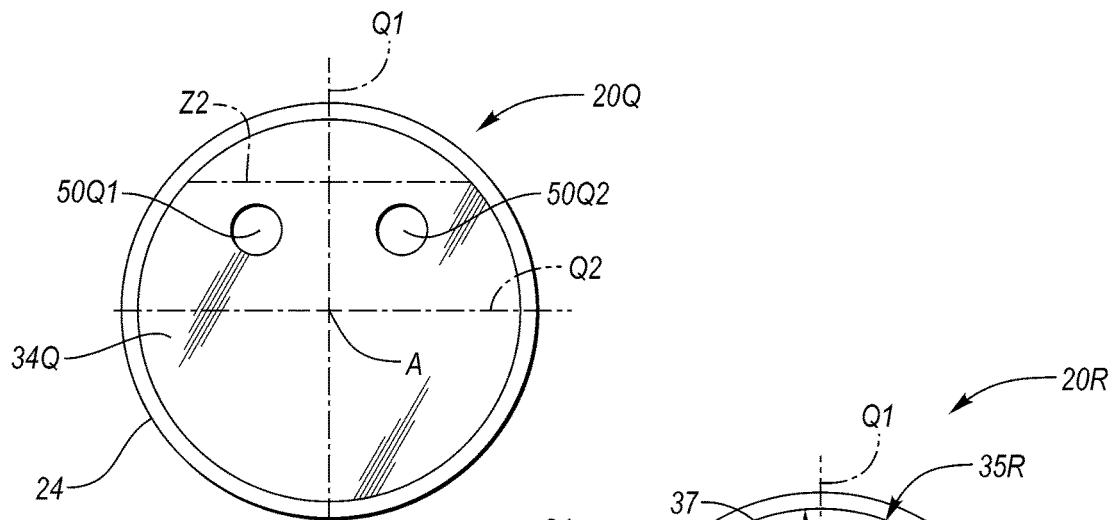
FIG. 18
FIG. 19
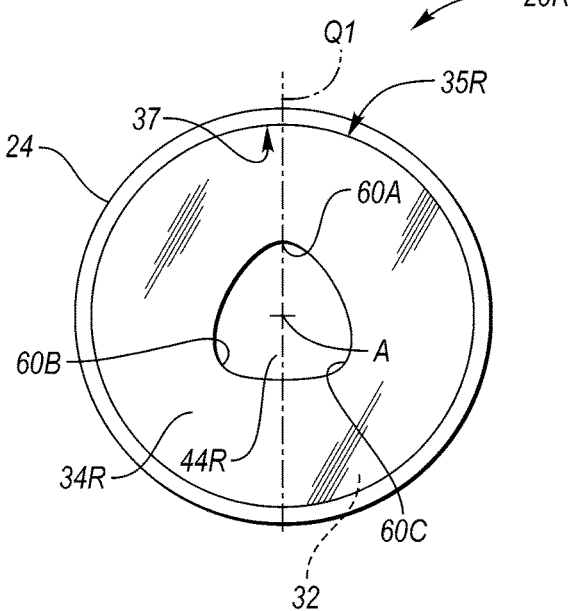
FIG. 20

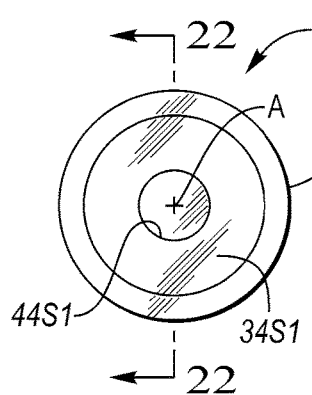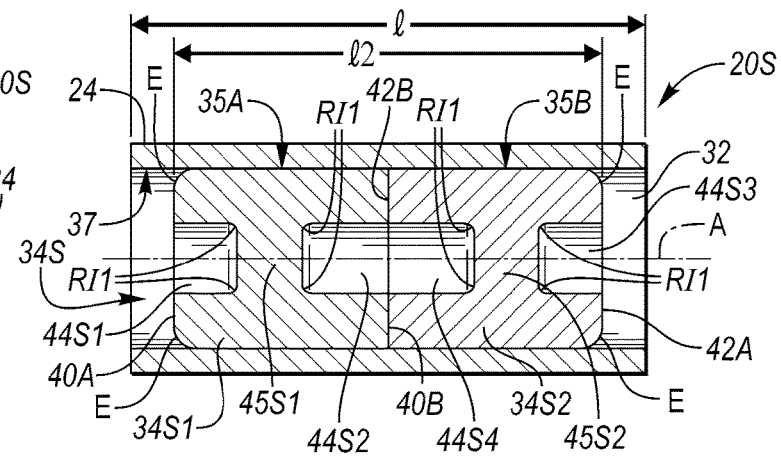
FIG. 21          FIG. 22
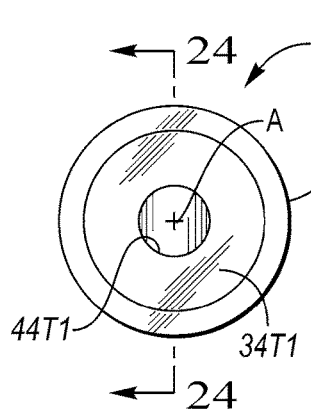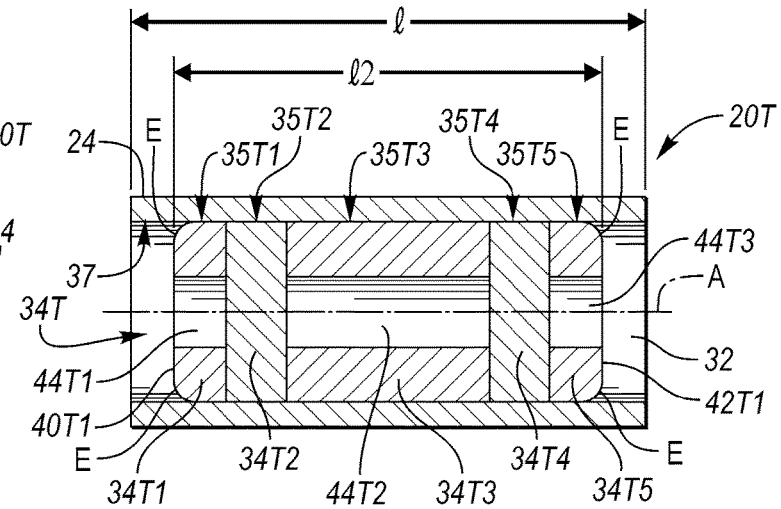
FIG. 23          FIG. 24

PISTON PIN WITH OUTER MEMBER AND CORE AND METHOD OF MANUFACTURING A PISTON PIN

TECHNICAL FIELD

The present teachings generally include an assembly with a piston pin and a method of manufacturing a piston pin.

BACKGROUND

Piston pins are used to connect a connecting rod with a piston in an engine. The piston pin fits in a pin bore of the piston, and the connecting rod fits around the piston pin between two portions of the pin bore. The connecting rod is attached to a crankshaft. The piston pin must be designed to meet bending deflection, ovaling deflection and stress constraints.

SUMMARY

An assembly, such as a piston assembly for a combustion engine, compressor, or other device, includes a piston pin that has an outer member and a core. The outer member has a cavity extending lengthwise therethrough. The cavity has a first volume. For example, the cavity may be cylindrical with an inner cylindrical surface such that the first volume is cylindrical. The core is fit to the outer member in the cavity, and has a second volume less than the first volume. For example, the second volume may be less than the first volume due to an opening in the core, because the core is shorter in length than the cavity, or both.

In an embodiment, the piston pin may include only the piston pin and a single piece core and as such is a two-piece piston pin. In other embodiments, the core may include multiple discrete components, referred to as core portions. In one embodiment, the outer member has a first length and the core has a second length less than the first length such that the outer member extends axially beyond the core at opposite ends of the core. For example, a ratio of the second length to the first length may be from about 0.4 to about 0.9. For example, the outer member may be relatively thin, allowing a core of a relatively light material to be used to meet stress and deflection limitations while still decreasing overall weight in comparison to a typical piston pin.

In some embodiments, the core has one or more openings, such as a first opening extending lengthwise through the core. A variety of core configurations are disclosed herein. Providing an opening in the core addresses potential issues with differing thermal expansion coefficients of the outer member and the core. For example, with a solid aluminum core and a steel outer member, due to the greater thermal expansion coefficient of aluminum, the core must be able to expand, but must still be maintained within the outer member over the entire range of operating temperatures of the piston pin. The opening provides a volume in which thermal expansion can occur.

In some embodiments, the first opening may be a central opening extending through the core. Additional openings may be spaced around the central opening and extend lengthwise through the core. In other embodiments, the additional openings may also be entirely within the core such that the additional openings are open only on opposite ends of the core. The additional openings may be open to an inner surface of the outer member at an outer periphery of the core along the length of the core. In some embodiments, the core has spokes between the additional openings.

Optionally, at least some of the spokes may be larger at an outer end than at an inner end to help bear compressive forces and limit deflection of the piston pin.

In one embodiment, the core has an outer cylindrical surface fittable to the inner cylindrical surface of the outer member in the cavity. The core at least partially defines a second opening extending lengthwise through the core. The first opening and the second opening may be the only openings in the core, and may be positioned in adjacent quadrants of the core. The piston pin may be fixed in a pin bore of a piston such that the first opening and the second opening are positioned in a half of the core nearest a crown of the piston. The core may be any of a variety of materials, and may be more or less dense than the outer member. For example, the core may be but is not limited to any one of aluminum, carbon fiber, titanium, or steel. In one embodiment, the outer member is steel and the core is titanium.

A method of manufacturing a piston pin assembly comprises providing an outer member having a first density and a first length, and creating a cavity that extends lengthwise through the outer member. The method includes providing a core having a second density and a second length, and inserting the core into the cavity of the outer member, such as by press-fitting. At least one of the following conditions is present under the method: the second length is less than the first length, and/or the core at least partially forms an opening extending lengthwise therethrough. The core may be provided by any method such as but not limited to: extruding the core, blowing the core from an expanding metal foam, casting the core, sintering the core from powdered metal, or by three-dimensional printing of the core.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 18 is a schematic perspective illustration of an alternative embodiment of a piston pin with an outer member shown in phantom.

FIG. 19 is a schematic end view illustration of the piston pin of FIG. 18.

FIG. 20 is a schematic end view illustration of an alternative embodiment of a piston pin.

FIG. 21 is a schematic end view illustration of an alternative embodiment of a piston pin.

FIG. 22 is a schematic cross-sectional illustration of the piston pin of FIG. 21 taken at lines 22-22 in FIG. 21.

FIG. 23 is a schematic end view illustration of an alternative embodiment of a piston pin.

FIG. 24 is a schematic cross-sectional illustration of the piston pin of FIG. 23 taken at lines 24-24 in FIG. 23.

DETAILED DESCRIPTION

Figure 1:
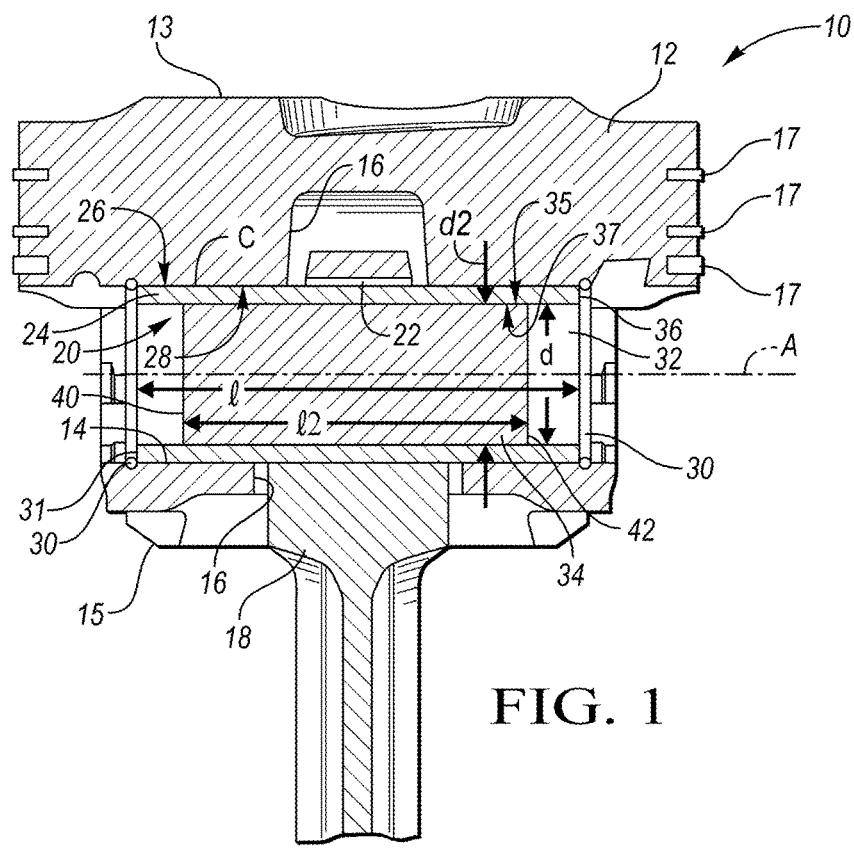
FIG. 1 is a schematic illustration in fragmentary cross-sectional view of a piston and connecting rod assembly including a piston pin.

Referring to the drawings, wherein like reference numbers refer to like components throughout the several views, FIGS. 1-28 show various embodiments of piston pins configured to satisfy predetermined bending and ovaling deflection parameters while meeting stress constraints and reducing weight and addressing any thermal expansion differential of different materials that may be used for components of a piston pin. FIG. 1 shows a piston and connecting rod assembly 10. A piston 12 has a cylindrical pin bore 14. The piston 12 is cast or otherwise provided with an opening 16 that intersects the pin bore 14 and is configured to accept a connecting rod 18, shown in fragmentary view. The piston 12 has a crown 13 and a skirt 15. Due to combustion pressure, the side of the piston 12 at the crown 13 receives greater combustion forces during engine operation than the side of the piston 12 at the skirt 15. A ring pack 17 surrounds a side surface of the piston 12 and assists in sliding contact with the cylinder block in a cylinder bore (not shown) while retaining combustion gases in the cylinder bore, as is understood by those skilled in the art.

A piston pin 20 is press-fit or otherwise inserted in the pin bore 14 and through an opening 22 in the connecting rod 18. The piston pin 20 includes an outer member 24 which is a relatively thin-walled, cylindrical shell. An outer cylindrical surface 26 of the outer member 24 fits to an inner surface 28 of the piston 12 at the pin bore 14. The piston pin 20 is a floating pin in that it can rotate relative to both the piston 12 and the connecting rod 18. The piston pin 20 is held in place axially by snap rings 30 positioned in the piston 12. A clearance C between the piston pin 20 and the piston 12 remains over at least a portion of a range of operating temperatures to allow lubrication and relative rotation of the piston pin 20.

A cavity 32 is provided in the outer member 24, such as by machining. The cavity 32 extends lengthwise through the outer member 24 along a longitudinal center axis A of the outer member 24. In an embodiment, the cavity 32 is generally cylindrical in the embodiment shown. In one non-limiting example, the thickness of the wall of the outer member 24 may be about 2.5 millimeters (mm), with a cavity diameter d of about 19 mm. In another non-limiting example, the cavity diameter d may be about 27 mm. The length l of the outer member 24 from a first end 31 to a second end 36 may be about 75 mm. The outer member 24 is not limited to these dimensions, and may have other dimensions within the scope of the present teachings. The cavity 32 has a first volume V1, which in the embodiment shown is a cylindrical volume determined by the length l and the diameter d as follows:

$V1 = (\pi l d^2)/4$; where l is the length of the cavity 32, and d is the diameter of the cavity 32.

The piston pin 20 also includes a core 34 with an outer surface 35 fit to an inner surface 37 of the outer member 24 in the cavity 32. The core 34 is a solid cylindrical member with an outer diameter d2 configured to allow the core 34 to be press-fit to the outer member 24 in the cavity 32 and retained therein over an entire range of operating temperatures. In other words, the outer diameter d2 is substantially equal to the diameter d of the cavity 32. The core 34 may be the same or a different material than the outer member 24. If the outer member 24 and the core 34 are different materials with different thermal expansion coefficients, the materials are selected and the diameter d of the cavity 32 and the outer diameter d2 of the core 34 are configured to ensure that the core 34 is retained in an inserted position in the outer member 24 over an entire range of operating temperatures of the piston 12 and piston pin 20. In a non-limiting example, the outer member 24 may be steel, and the core 34 may be aluminum, carbon fiber, titanium, or steel. The outer member 24 may have a first density, and the core 34 may have a second density that may be less than, the same as, or greater than the first density. In various combinations of densities and lengths, the piston pin 20 may be lighter than a solid steel piston pin while still meeting predetermined bending deflection, ovaling deflection and stress constraints, as is understood by those skilled in the art.

In the embodiment of FIG. 1, the core 34 has a length l2 much less than the length l of the outer member 24. The outer member 24 thus extends axially beyond the core 34 at opposite ends 40, 42 of the core 34. In one non-limiting example, the length l of the cavity 32 is 75 mm and the length l2 of the core 34 is 55 mm. A ratio of the second length l2 to the first length l may range from 0.4 to 0.9 in various embodiments. The core 34 therefore has a second volume V2 less than the first volume V1. For a cylindrical core, the second volume V2 is determined as:

$V2=(\pi*l2*d2^2)/4$; where l2 is the length of the core 34, and d2 is the diameter of the core 34.

In other embodiments shown herein, a core can be used that has the same length as the cavity 32, but that is non-cylindrical in that it has an opening in it that decreases its volume such that the second volume V2 is even less than the cylindrical volume V2 set forth above.

Figure 2:
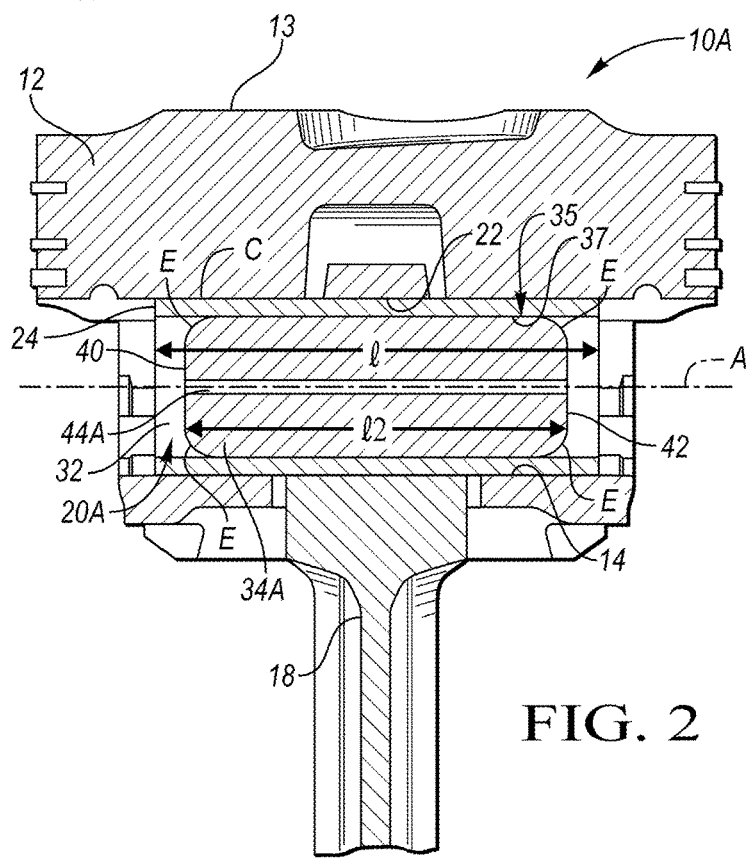
FIG. 2 is a schematic illustration in fragmentary cross-sectional view of another embodiment of a piston and connecting rod assembly including another embodiment of a piston pin.

FIGS. 2-28 show various alternative piston pins each having the same outer member 24 but utilizing different cores. FIG. 2 shows another embodiment of a piston and connecting rod assembly 10A that has many of the same components as those of the piston and connecting rod assembly 10 of FIG. 1. The piston and connecting rod assembly 10A includes a piston pin 20A that is a "fixed pin" in that it is shrunk fit into the connecting rod 18 at the opening 16 (i.e., cannot rotate relative to the connecting rod 18) and rotates only relative to the piston 12. Because the piston pin 20A is held in an axial position by the connecting rod 18, there is no need for the snap rings 30 of FIG. 1.

The piston pin 20A includes the outer member 24 having the cavity 32 extending lengthwise therethrough and having the first volume V1 discussed above. A core 34A is press-fit into the cavity 32 so that the outer surface 35 of the core 34A is held to the inner surface 37 of the outer member 24. The core 34A may be any of the materials and relative densities discussed herein. The core 34A at least partially defines a first opening 44A extending lengthwise through the core 34A. The first opening 44A is a central opening in that it is centered in the core 34A and extends along the axis A of the outer member 24. The core 34A may have the same second length l2 as the core 34 or a different second length. Additionally, the core 34A has rounded edges E at both the first and second ends 40, 42 of the core 34A. The rounded edges E may reduce stress concentrations in comparison to a core with angled edges, such as if the edges were formed by 90 degree angles of the end 40 or 42 to the surface 35. For example, the edges E may have a radius of curvature of 0.2 to 3 mm. These rounded edges can also be used on any of the other embodiments described herein to reduce stresses. Due to the shorter length l2, the central opening 44A, and the rounded edges E, the core 34A has a second volume less than the first volume V1 of the cavity 32.

Figure 3:
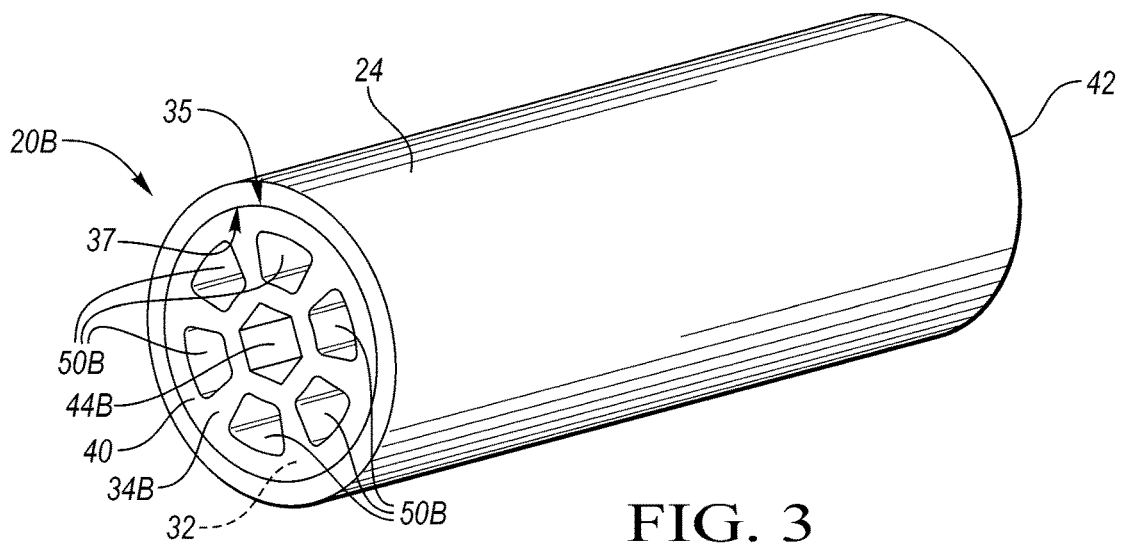
FIG. 3 is a schematic perspective illustration of another embodiment of a piston pin.
Figure 4:
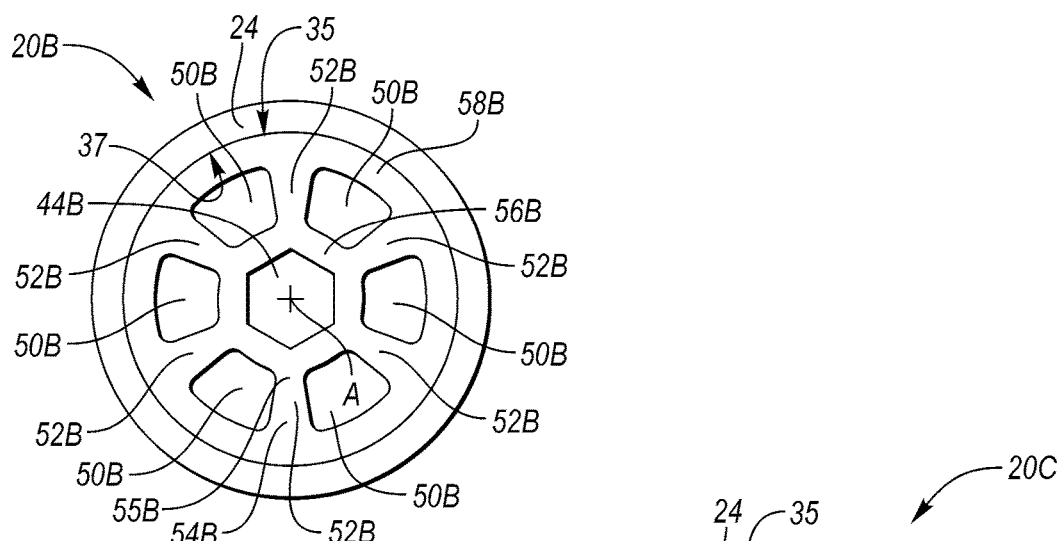
FIG. 4 is a schematic end view illustration of the piston pin of FIG. 3.

A variety of different cores can be used with the outer member 24 to provide various desired characteristics different than those of a single solid piston pin or a piston pin having an outer member with a solid core (with no openings) and with the same length as the outer member 24. For example, FIG. 3 shows a piston pin 20B that has a core 34B inserted in the cavity 32 and press-fit to the outer member 24 in the cavity 32. The core 34B includes a first opening 44B that extends lengthwise through the entire core 34B and is a central opening of a hexagonal shape in cross-section.

Six additional openings 50B of hexagonal shape in cross section are equally spaced around the central opening 44B and extend lengthwise through the core 34B such that the additional openings 50B are open only on the opposite ends 40, 42 of the core. Accordingly, the outer surface 35 of the core 34B is cylindrical and fits to the inner surface 37 of the outer member 24. In the embodiment shown, the core 34B is of the same length l as the outer member 24, although the core 34B could be made shorter. Due to the openings 44B, 50B, the core 34B has a second volume less than the first volume V1 of the cavity 32.

The arrangement of the openings 50B around the opening 44B creates an inner hub 56B and an outer hub 58B. The outer hub 58B forms the cylindrical outer surface 35 in contact with the inner surface 37 of the outer member 24.

The core 34B has spokes 52B between the additional openings 50B. The spokes 52B are larger at an outer end 54B than at an inner end 55B, where the outer end 54B is radially outward of the inner end 55B relative to the axis A, as illustrated with respect to one of the spokes 52B. The core 34B includes six spokes 52B extending from a center of the core 34B (i.e., from the inner hub 56B).

Figure 5:
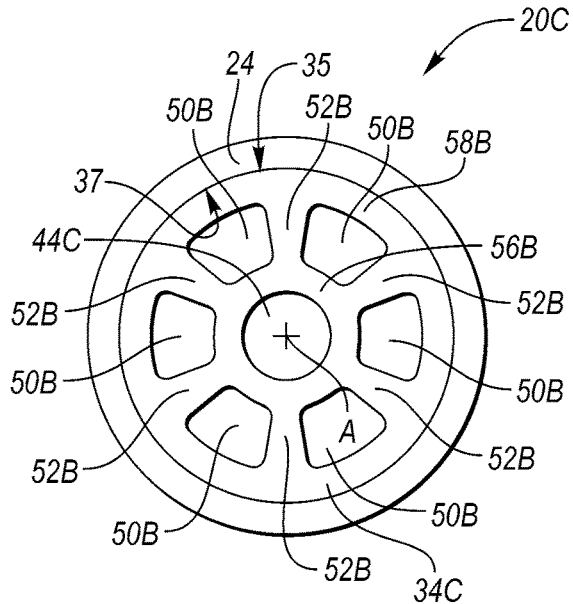
FIG. 5 is a schematic end view illustration of an alternative embodiment of a piston pin.

FIG. 5 illustrates an alternative embodiment of a piston pin 20C alike in all aspects to piston pin 20B except that a core 34C has a center opening 44C that is a central opening of a circular cross-sectional shape, instead of the hexagonal center opening 44B of FIG. 2.

Figure 6:
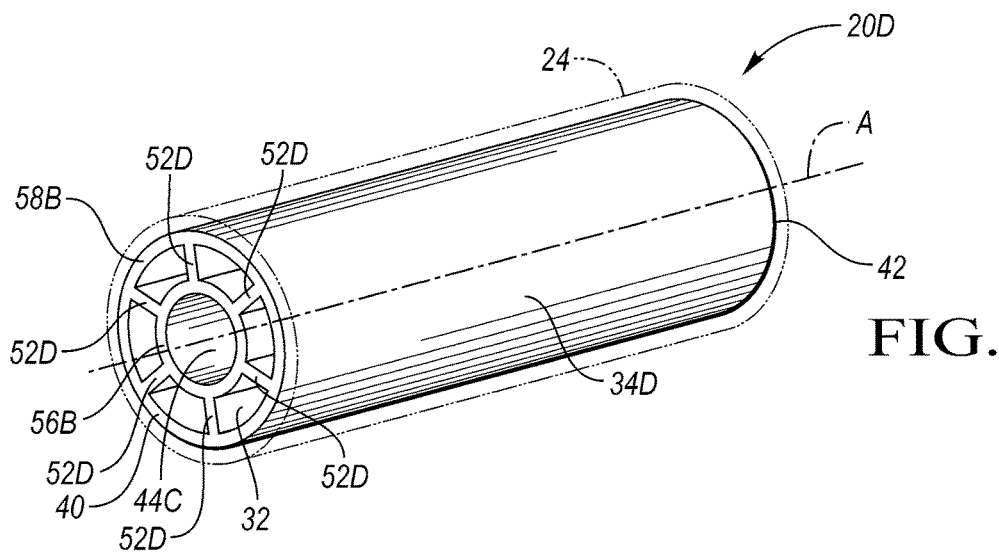
FIG. 6 is a schematic perspective illustration of an alternative embodiment of a piston pin with an outer member shown in phantom.

FIG. 6 illustrates an alternative embodiment of a piston pin 20D alike in all aspects to piston pin 20C except that a core 34D has spokes 52D that are not wider at an outer end than at an inner end.

Figure 7:
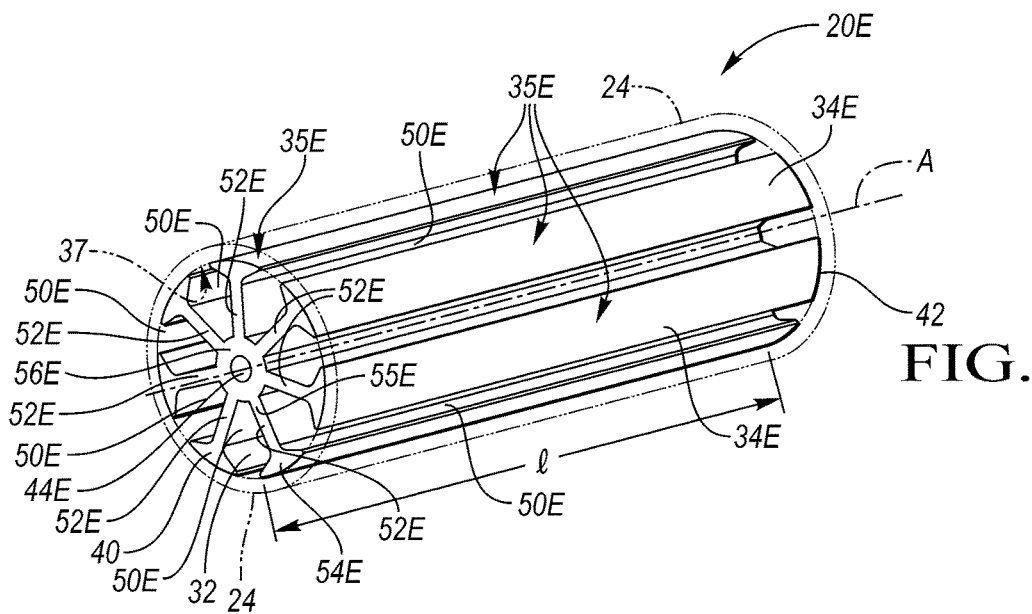
FIG. 7 is a schematic perspective illustration of an alternative embodiment of a piston pin with an outer member shown in phantom.

FIG. 7 shows a piston pin 20E that includes the outer member 24 (shown only in phantom) having the cavity 32 extending lengthwise therethrough and having the first volume V1 as discussed with respect to FIGS. 1 and 2. A core 34E is press-fit into the cavity 32 so that its outer surface 35E is held to the inner surface 37 of the outer member 24. The core 34E has the same length l as outer member 24 or can have a shorter length than the outer member 24. The core 34E may be any of the materials and relative densities discussed above. The core 34E at least partially defines a first opening 44E extending lengthwise through the core 34E. The first opening 44E is of a circular cross-sectional shape and is a central opening in that it is centered in the core 34E around the axis A of the outer member 24.

Seven additional openings 50E are equally spaced around the central opening 44E and extend lengthwise through the core 34E. The openings 50E are open both on the opposite ends 40, 42 of the core 34E and along an outer periphery of the core 34E along the length of the core 34E such that the openings 50E open to the inner surface 37 of the outer member 24.

The arrangement of the openings 50E around the opening 44E creates an inner hub 56E. The core 34E includes seven spokes 52E extending from a center of the core 34E (i.e., from the inner hub 56E) between the additional openings 50E. The spokes 52E are larger at an outer end 54E than at an inner end 55E such that the outer ends 54E form supportive feet engaged with the inner surface 37, similar to an I-beam configuration. The outer ends 54E are curved to fit to the inner surface 37 of the outer member 24.

Accordingly, the outer surface 35E of the core 34E at the outer ends 54E extends along the length of the core 34E, and defines an outer periphery of the core 34E that fits to the inner surface 37 of the outer member 24. In the embodiment shown, the core 34E is of the same length l as the outer member 24, although the core 34E could be made shorter. The core 34E may be any of the materials and have any of the relative lengths and densities discussed herein. Due to the openings 44E, 50E, the core 34E has a second volume less than the first volume V1 of the cavity 32.

Figure 8:
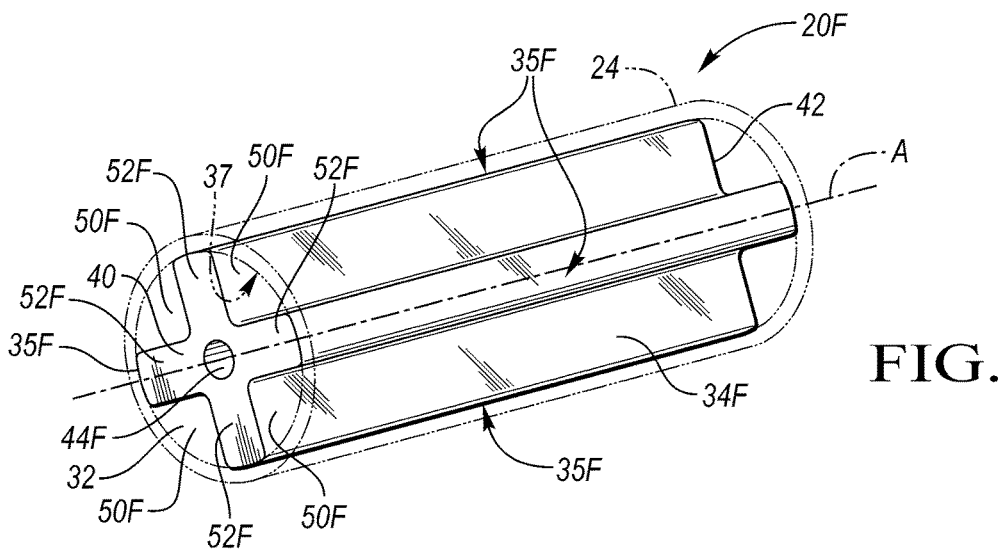
FIG. 8 is a schematic perspective illustration of an alternative embodiment of a piston pin with an outer member shown in phantom.

FIG. 8 shows a piston pin 20F that includes the outer member 24 (shown only in phantom) having the cavity 32 extending lengthwise therethrough and having the first volume V1 as discussed with respect to FIGS. 1 and 2. A core 34F is press-fit into the cavity 32 so that its outer surface 35F is held to the inner surface 37. The core 34F has the same length l as outer member 24 or can have a shorter length than the outer member 24. The core 34F may be any of the materials and relative densities discussed herein. The core 34F at least partially defines an optional first opening 44F extending lengthwise through the core 34F. The optional first opening 44F is of a circular cross-sectional shape and is a central opening in that it is centered in the core 34F and is centered around the axis A of the outer member 24.

Four additional openings 50F are equally spaced around the optional central opening 44F and extend lengthwise through the core 34F. The openings 50F are open both on the opposite ends 40, 42 of the core 34F and along an outer periphery of the core 34F along the length of the core 34F such that the openings 50F open to the inner surface 37 of the outer member 24.

The core 34F includes four spokes 52F extending from a center of the core 34F between the additional openings 50F. The spokes 52F have curved outer ends such that the outer ends 54F form an outer surface 35F of the core 34F extending along the length of the core 34F, and define an outer periphery of the core 34F that fits to the inner surface 37 of the outer member 24. In the embodiment shown, the core 34F is of the same length l as the outer member 24, although the core 34F could be made shorter. The core 34F may be any of the materials and have any of the relative lengths and densities discussed herein. Due to the optional opening 44F and the openings 50F, the core 34F has a second volume less than the first volume V1 of the cavity 32.

Figure 9:
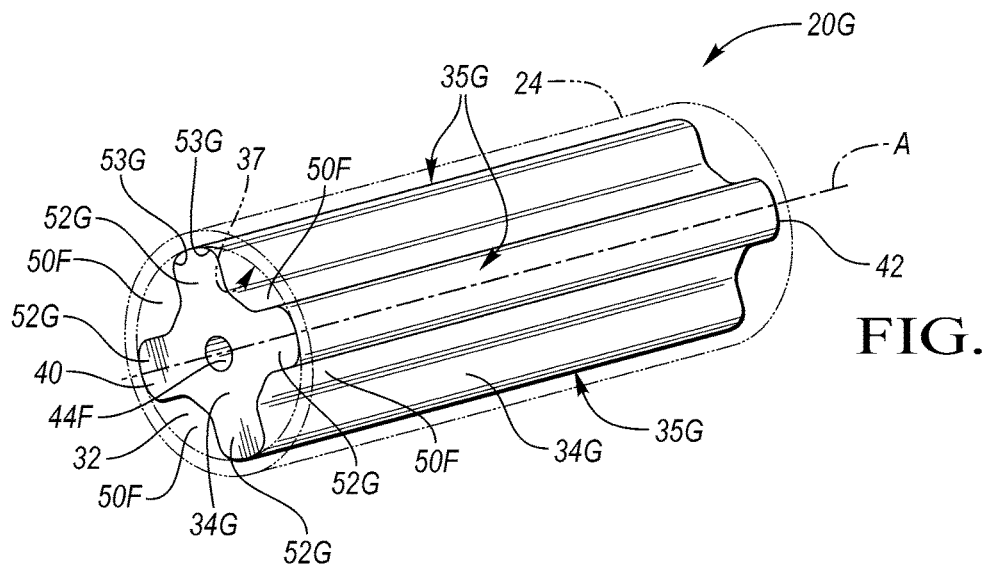
FIG. 9 is a schematic perspective illustration of an alternative embodiment of a piston pin with an outer member shown in phantom.

FIG. 9 illustrates an alternative embodiment of a piston pin 20G alike in all aspects to piston pin 20F, including the optional central opening 44F and four additional openings 50F, except that a core 34G has spokes 52G that have outer ends with curved corners 53G each having a larger radius than the spokes 52F in FIG. 8. The spokes 52G thus have no edges at the outer surface 35G of the core 34G in contact with the inner surface 37 of the outer member 24. Due to the optional opening 44F and the openings 50F, the core 34G has a second volume less than the first volume V1 of the cavity 32.

Figure 10:
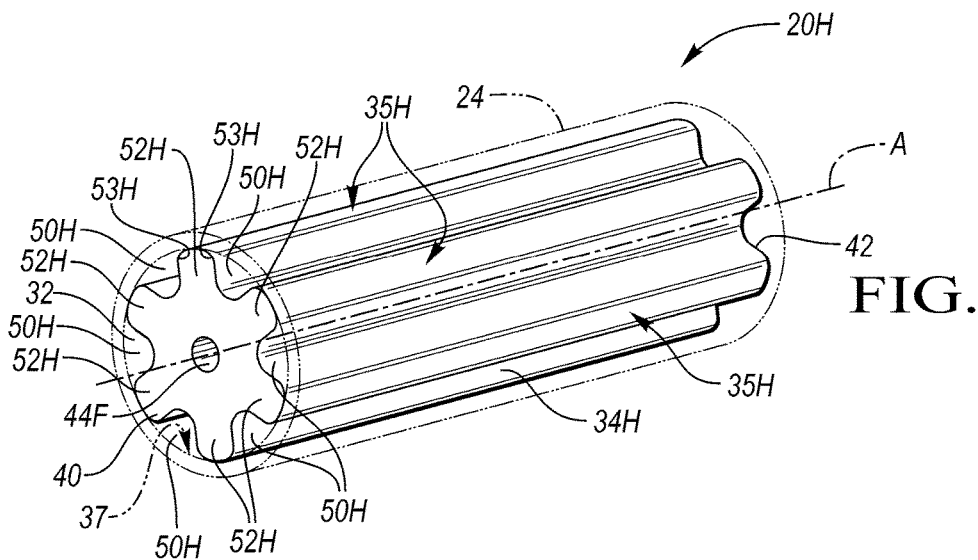
FIG. 10 is a schematic perspective illustration of an alternative embodiment of a piston pin with an outer member shown in phantom.

FIG. 10 illustrates an alternative embodiment of a piston pin 20H alike in all aspects to piston pin 20G, including the optional central opening 44F, except that a core 34H has six spokes 52H. The spokes 52H have a radius (i.e., curved corners 53H) at outer ends of the spokes 52H. The spokes 52H thus have no edges at the outer surface 35H in contact with the inner surface 37 of the outer member 24. Due to the optional opening 44F and the openings 50H, the core 34H has a second volume less than the first volume V1 of the cavity 32.

Figure 11:
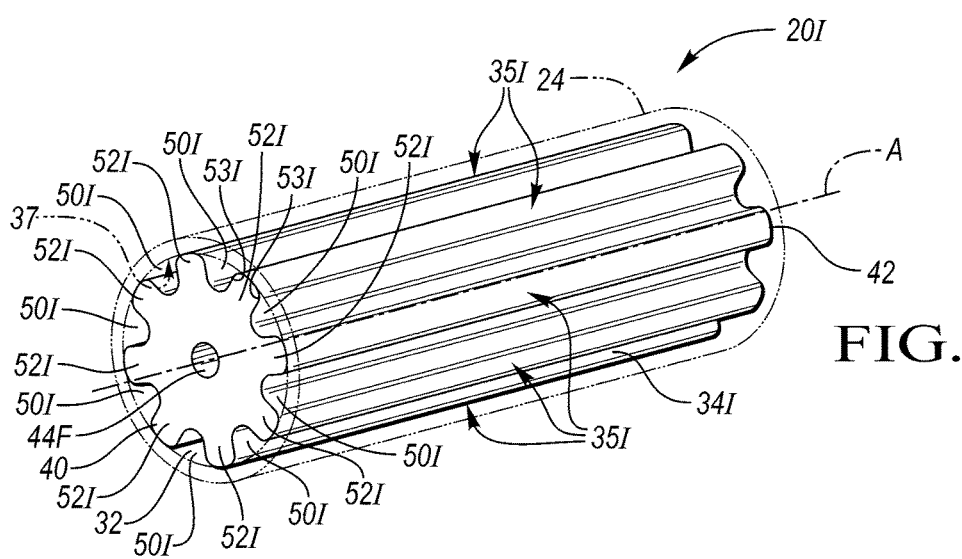
FIG. 11 is a schematic perspective illustration of an alternative embodiment of a piston pin with an outer member shown in phantom.

FIG. 11 illustrates an alternative embodiment of a piston pin 20I alike in all aspects to piston pin 20G, including the optional central opening 44F, except that a core 34I has eight spokes 52I. The spokes 52I have a radius (i.e., curved corners 53I) at outer ends of the spokes 52I. The spokes 52I thus have no edges at the outer surface 35I of the core 34I in contact with the inner surface 37 of the outer member 24. The core 34I may be any of the materials and have any of the relative lengths and densities discussed herein. Due to the optional opening 44F and the openings 50I, the core 34I has a second volume less than the first volume V1 of the cavity 32.

Figure 12:
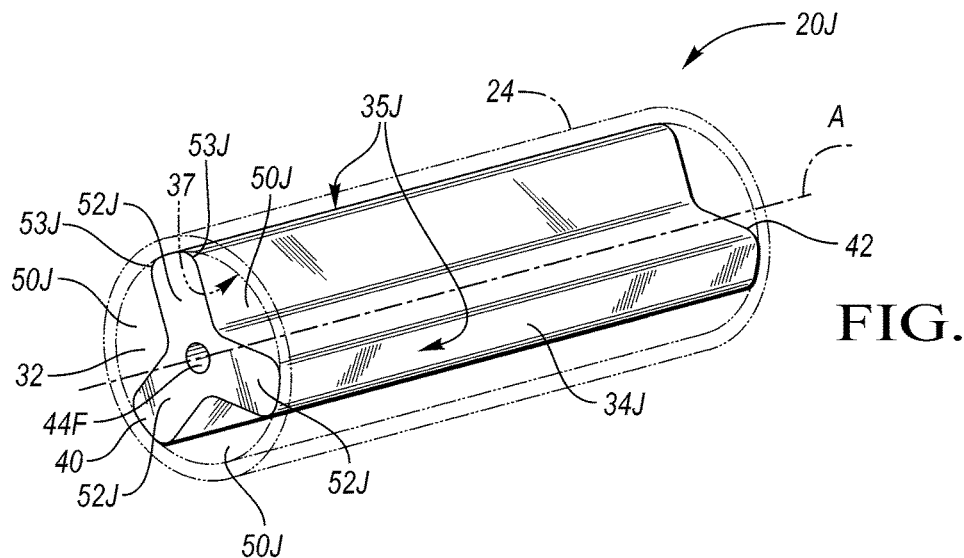
FIG. 12 is a schematic perspective illustration of an alternative embodiment of a piston pin with an outer member shown in phantom.

FIG. 12 illustrates an alternative embodiment of a piston pin 20J alike in all aspects to piston pin 20G, including the optional central opening 44F, except that a core 34J has three spokes 52J. The spokes 52J have a radius (i.e., curved corners 53J) at outer ends of the spokes 52J. The spokes 52J thus have no edges at the outer surface 35J in contact with the inner surface 37 of the outer member 24. The core 34J may be any of the materials and have any of the relative lengths and densities discussed herein. Due to the optional opening 44F and the openings 50J, the core 34J has a second volume less than the first volume V1 of the cavity 32.

Figure 13:
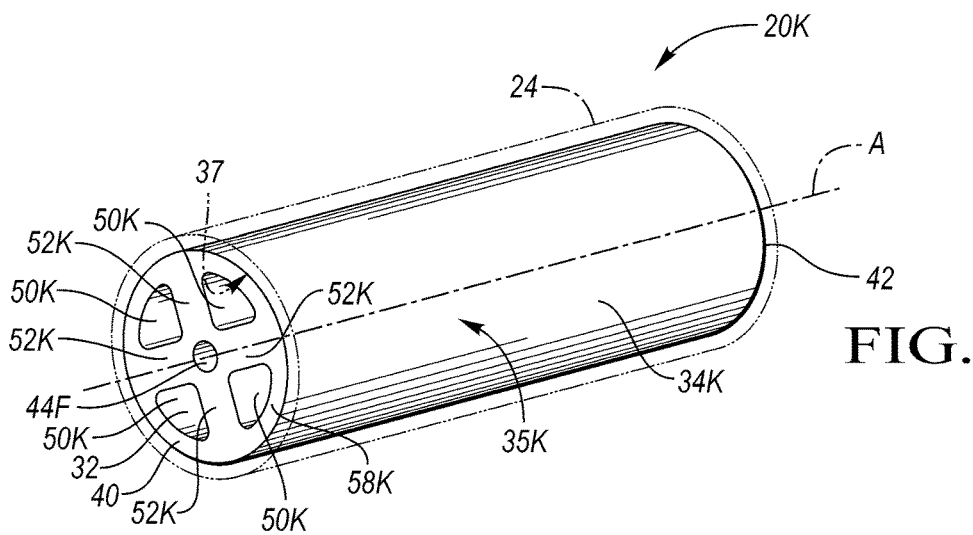
FIG. 13 is a schematic perspective illustration of an alternative embodiment of a piston pin with an outer member shown in phantom.

FIG. 13 illustrates an alternative embodiment of a piston pin 20K that includes a core 34K with the optional central opening 44F and four spokes 52K forming four additional openings 50K. An outer hub 58K at outer ends of the spokes 52K forms the cylindrical outer surface 35K in contact with the inner surface 37 of the outer member 24. The core 34K may be any of the materials and have any of the relative lengths and densities discussed herein. Due to the optional opening 44F and the openings 50K, the core 34K has a second volume less than the first volume V1 of the cavity 32.

Figure 14:
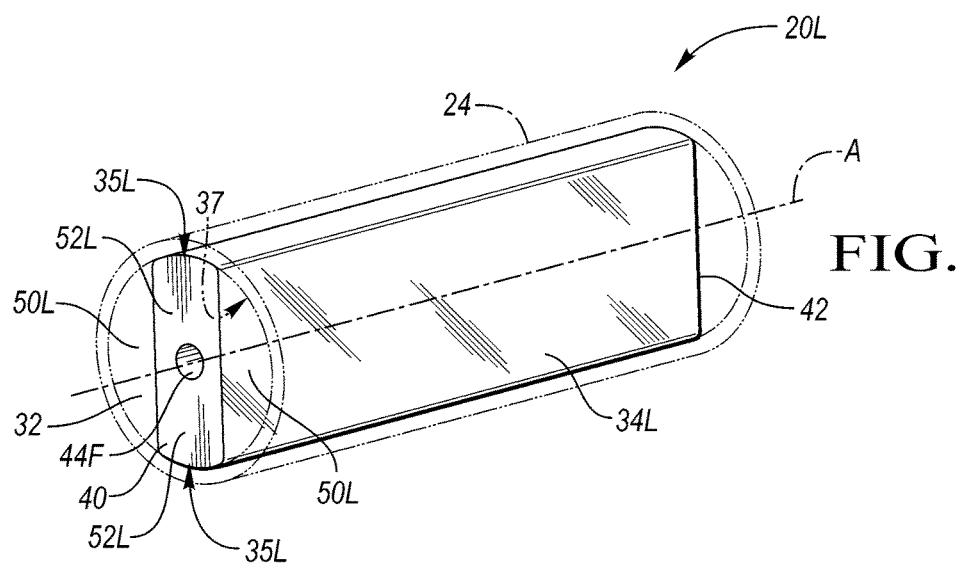
FIG. 14 is a schematic perspective illustration of an alternative embodiment of a piston pin with an outer member shown in phantom.

The piston pins of FIGS. 1-12 are suitable for use in either a floating pin or a fixed pin arrangement in a piston. FIGS. 14-20 show embodiments of piston pins that may be best suited for use in fixed pin arrangements in the piston 12 of FIG. 2. More specifically, the cores of these piston pins are configured to best withstand combustion forces and meet bending, ovaling, and stress constraints when configured in a fixed orientation relative to the piston 12. For example, FIG. 14 shows an alternative embodiment of a piston pin 20L that includes a core 34L with the optional central opening 44F and two spokes 52L forming two additional openings 50L. Outer ends of the spokes 52L form the outer surface 35L in contact with the inner surface 37 of the outer member 24. The core 34L may be any of the materials and have any of the relative lengths and densities discussed herein. The core 34L best withstands forces during operation of the piston assembly 10A of FIG. 2 when inserted in the pin bore 14 so that the spokes 52L are in a vertical position. In other words, the outer surface 35L of one of the spokes 52L should extend toward the crown 13 of the piston 12. Due to the optional opening 44F and the openings 50L, the core 34L has a second volume less than the first volume V1 of the cavity 32.

Figure 15:
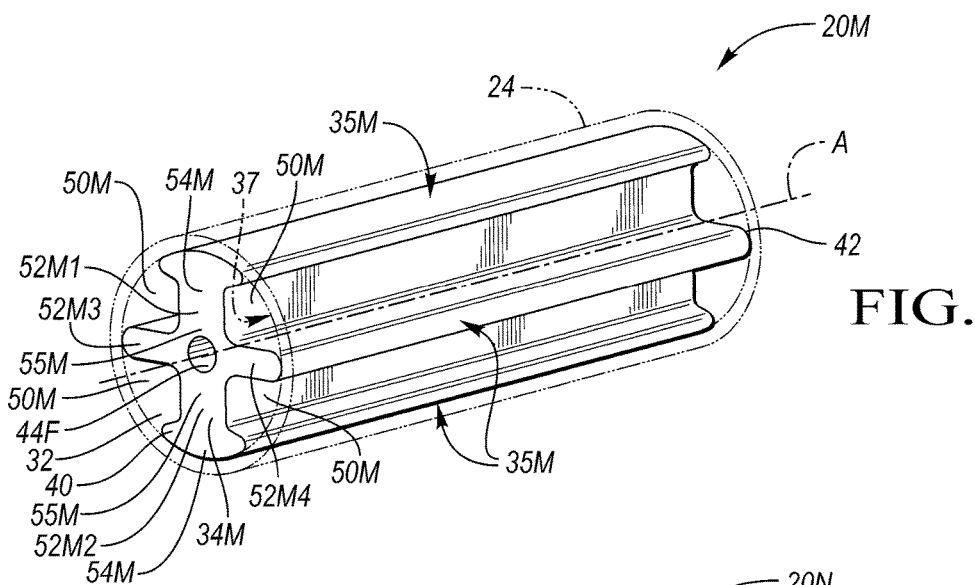
FIG. 15 is a schematic perspective illustration of an alternative embodiment of a piston pin with an outer member shown in phantom.

FIG. 15 shows an alternative embodiment of a piston pin 20M that includes a core 34M with the optional central opening 44F and four spokes 52M1, 52M2, 52M3, and 52M4 forming four additional openings 50M. Outer ends of the spokes 52M1, 52M2, 52M3, and 52M4 form the outer surface 35M in contact with the inner surface 37 of the outer member 24. Two of the spokes 52M1 and 52M2 are thicker than the remaining spokes 52M3 and 52M4, and are larger at an outer end 54M than at an inner end 55M such that the outer ends 54M form supportive feet engaged with the inner surface 37, similar to an I-beam configuration. The outer ends 54M are curved to fit to the inner surface 37 of the outer member 24. The core 34M may be any of the materials and have any of the relative lengths and densities discussed herein. The core 34M best withstands forces during operation of the piston assembly 10A when inserted in the pin bore 14 so that the spokes 52M1 and 52M2 are in a vertical position, due to their greater width and their larger outer ends 54M. Stated differently, a first pair of the spokes (52M1 and 52M2) should be positioned in the piston 12 of FIG. 2 to extend lengthwise generally toward a crown 13 of the piston 12, and a second pair of the spokes (52M3 and 52M4) extend lengthwise generally perpendicular to the first pair of the spokes. Due to the optional opening 44F and the openings 50M, the core 34M has a second volume less than the first volume of the cavity 32.

Figure 16:
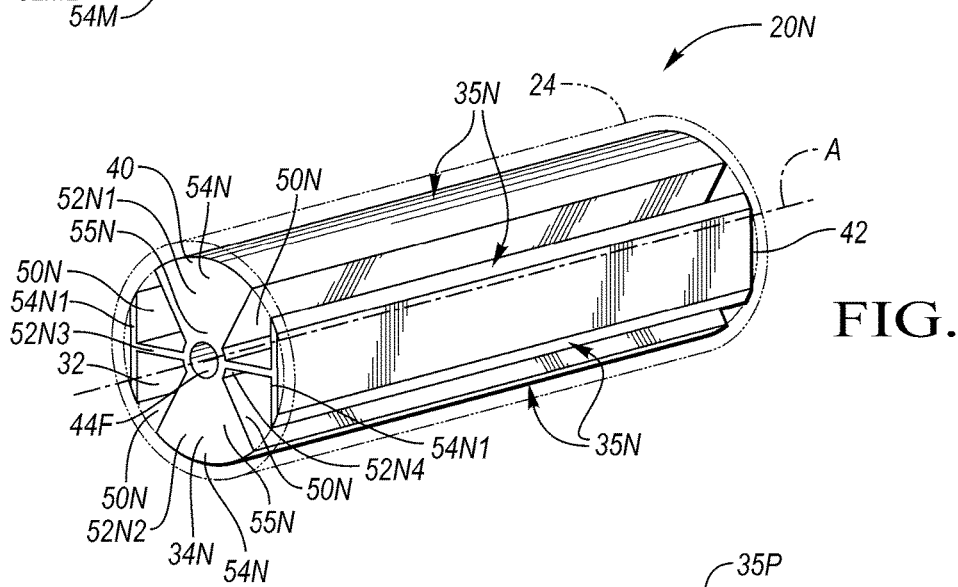
FIG. 16 is a schematic perspective illustration of an alternative embodiment of a piston pin with an outer member shown in phantom.

FIG. 16 shows an alternative embodiment of a piston pin 20N that includes a core 34N with the optional central opening 44F and four spokes 52N1, 52N2, 52N3, and 52N4 forming four additional openings 50N. The core 34N may be any of the materials and have any of the relative lengths and densities discussed herein. Outer ends of the spokes 52N1, 52N2, 52N3, and 52N4 form the outer surface 35N in contact with the inner surface 37 of the outer member 24.

Two of the spokes 52N1 and 52N2 are thicker than the remaining spokes 52N3 and 52N4, and are enough larger at an outer end 54N than at an inner end 55N such that the spokes 52N1 and 52N2 themselves form supportive feet engaged at the outer ends 54N with the inner surface 37, similar to an I-beam configuration. The outer ends 54N are curved to fit to the inner surface 37 of the outer member 24. The narrower spokes 52N3 and 52N4 also have feet engaged with the inner surface 37 and extending perpendicular to their lengths at outer ends. The feet 54N1 and 54N2 contact the inner surface 37 of the outer member 24 only at their ends. In other words, the feet 54N1 and 54N2 are not curved to enable their entire outer surface to contact the inner surface 37 as are the outer ends 54N. The core 34N best withstands forces during operation of the piston assembly 10A when inserted in the pin bore 14 so that the spokes 52N1 and 52N2 are in a vertical position, due to their greater width and their outer ends 54N. Stated differently, a first pair of the spokes (52N1 and 52N2) should be positioned in the piston 12 of FIG. 2 to extend lengthwise generally toward a crown 13 of the piston 12, and a second pair of the spokes (52N3 and 52N4) extend lengthwise generally perpendicular to the first pair of the spokes 52N1, 52N2. Due to the optional opening 44F and the openings 50N, the core 34N has a second volume less than the first volume V1 of the cavity 32.

Figure 17:
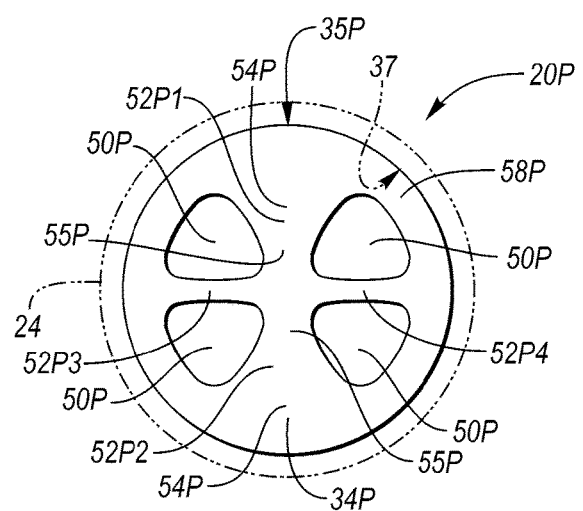
FIG. 17 is a schematic end view illustration of an alternative embodiment of a piston pin.

FIG. 17 illustrates an alternative embodiment of a piston pin 20P similar to piston pin 20K of FIG. 13 except that it includes a core 34P that has no central opening 44F, the spokes 52P1, 52P2, 52P3, and 52P4 have different widths, and an outer hub 58P at outer ends of the spokes forms the cylindrical outer surface 35P in contact with the inner surface 37 of the outer member 24. The four spokes 52P1, 52P2, 52P3, and 52P4 form four openings 50P equally spaced from one another in the core 34P. Two of the spokes 52P1 and 52P2 are thicker than the remaining spokes 52P3 and 52P4, and are larger at an outer end 54P than at an inner end 55P. The core 34P may be any of the materials and have any of the relative lengths and densities discussed herein. The core 34P best withstands forces during operation of the piston assembly 10A when inserted in the pin bore 14 so that the spokes 52P1 and 52P2 are in a vertical position, due to their greater width and their larger outer ends 54P. Stated differently, a first pair of the spokes (52P1 and 52P2) should be positioned in the piston 12 of FIG. 2 to extend lengthwise generally toward the crown 13 of the piston 12, and a second pair of the spokes (52P3 and 52P4) extend lengthwise generally perpendicular to the first pair of the spokes 52P1 and 52P2. Due to the openings 50P, the core 34P has a second volume less than the first volume V1 of the cavity 32.

FIGS. 18-19 show another embodiment of a piston pin 20Q that includes the outer member 24 having the cavity 32 extending lengthwise therethrough and having the first volume V1 as discussed with respect to FIGS. 1 and 2. A core 34Q is press-fit into the cavity 32 so that its outer surface 35Q is held to the inner surface 37. The core 34Q has the same length l as outer member 24 or can have a shorter length than the outer member 24. The outer surface 35Q is cylindrical. The core 34Q may be any of the materials and relative densities discussed herein. The core 34Q defines a first opening 50Q1 and a second opening 50Q2 both extending lengthwise through the core 34Q. The openings 50Q1 and 50Q2 are both of a circular cross-sectional shape and have longitudinal axes parallel to the center axis A of the outer member 24. The openings 50Q1 and 50Q2 open only at the opposite ends 40, 42 of the core 34Q.

As best shown in FIG. 19, the openings 50Q1 and 50Q2 are the only openings in the core 34Q, are of equal size, and are symmetrically positioned in adjacent quadrants of the core 34Q. Phantom lines Q1 and Q2 represent boundary lines that separate the core 34Q into quadrants. The core 34Q has no central opening. To best withstand combustion forces and meet bending, ovality, and stress constraints, the piston pin 20Q should be fixed in the pin bore 14 such that the first and the second openings 50Q1 and 50Q2 are positioned in a half of the core 34Q nearest the crown 13 of the piston 12. More specifically, the piston pin 20Q should be positioned so that the phantom boundary Q1 is vertical. When positioned in this manner, the bottom half of the core 34Q in the piston pin 20Q (below line Q2) is highly compressed leading to large stresses while a top portion above the openings 50Q1, 50Q2 experiences tensile stresses of lower magnitude. The zone in compression falls mainly below phantom line Q2. The zone in tension falls mainly above phantom line Z2. The openings 50Q1 and 50Q2 are in a neutral zone between lines Q2 and Z2 that experiences relatively low stress in comparison to the zone of compressive stress and the zone of tensile stress. By positioning the openings 50Q1 and 50Q2 between the compressive zone and the tensile zone, weight reduction and an open volume for potential thermal expansion may be achieved with minimal impact on bending and ovality.

FIG. 20 shows an additional embodiment of a piston pin 20R that includes the outer member 24 having the cavity 32 extending lengthwise therethrough and having the first volume V1 as discussed with respect to FIGS. 1 and 2. A core 34R is press-fit into the cavity 32 so that its outer surface 35R is held to the inner surface 37. The core 34R has the same length l as outer member 24 or can have a shorter length than the outer member 24. The outer surface 35R is cylindrical. The core 34R may be any of the materials and relative densities discussed herein. The core 34R defines only a first opening 44R extending lengthwise through the core 34R. The first opening 44R is of a rounded triangular cross-sectional shape that may be referred to as a tri-lobe shape. The first opening 44R is a central opening in that it is centered in the core 34R around the axis A of the outer member 24. The opening has three rounded corners 60A, 60B, and 60C. To best withstand combustion forces and meet bending, ovality, and stress constraints, the piston pin 20R should be fixed in the pin bore 14 such that the opening 44R is symmetrical about the phantom boundary Q1 perpendicular to the axis A, with the first corner 60A intersected by the boundary Q1. The first corner 60A will thus be positioned in a half of the core 34R nearest the crown 13 of the piston 12.

FIGS. 21 to 28 show various embodiments of piston pins that have multi-piece cores. FIGS. 21 and 22 show an additional embodiment of a piston pin 20S that includes the outer member 24 and a core 34S. The outer member 24 has the cavity 32 extending lengthwise therethrough and has the first volume V1 as discussed with respect to FIGS. 1 and 2. A core 34S is press-fit into the cavity 32. The core 34S includes multiple discrete core portions 34S1, 34S2 disposed adjacent to one another within the cavity 32. Core portion 34S1 is a first core portion and has a substantially cylindrical outer surface 35A interfacing with the inner surface 37 of the outer member 24 in the cavity 32. The first core portion 34S1 has a first opening 44S1 at an outer end 40A of the first core portion 34S1 that extends partially therethrough. The first core portion 34S1 has a second opening 44S2 at an inner end 40B of the first core portion 34S1 that extends partially therethrough toward the first opening 44S1. A first midportion 45S1 separates the first and second openings 44S1, 44S2.

The second core portion 34S2 has a substantially cylindrical outer surface 35B interfacing with the inner surface 37 of the outer member 24 in the cavity 32. The second core portion 34S2 has a third opening 44S3 at an outer end 42A of the second core portion 34S2 that extends partially therethrough. The second core portion 34S2 has a fourth opening 44S4 at an inner end 42B of the second core portion 34S2 extending partially therethrough toward the third opening 44S3. The inner end 40B of the first core portion 34S1 faces and may abut the inner end 42B of the second core portion 34S2.

A second midportion 45S2 separates the third and fourth openings 44S3, 44S4. The outer surfaces 35A, 35B are held to the inner surface 37 due to press-fitting or shrink-fitting. The overall length of the core 34S is the length l2, which is less than the length l of the outer member 24. The core 34S may be any of the materials and relative densities discussed herein. The openings 44S1, 44S2, 44S3, and 44S4 are each of a circular cross-sectional shape and are centered in the respective core portions 34S1, 34S2 around the axis A of the outer member 24.

The outer surfaces 35A and 35B, and of the first core portion 34S1 and the second core portion 34S2 at outer ends 40A and 42A may have rounded edges E with radii from about 0.2 mm to about 3 mm to reduce stress concentrations in comparison to sharp, angled edges. The surfaces of the core portions 34S1 and 34S2 at the openings 44S1, 44S2, 44S3, and 44S4 may have an internal radius RI1 between axial extending portions and radially extending portions such as from about 0.5 mm to 5 mm to reduce stress concentrations in comparison to sharp, angled edges.

The solid midportions 45S1 and 45S2 are positioned generally to span along the axis A to bridge between the piston 12 and the connecting rod 18 (i.e., so that the edges of both the piston 12 and the connecting rod 18 fall directly radially outward of the midportions 45S1 and 45S2), the midportions 45S1 and 45S2 thereby providing support in the areas bearing the greatest loading, while weight reduction is achieved in other areas bearing less loading via the openings 44S1, 44S2, 44S3, and 44S4.

FIGS. 23 and 24 show an additional embodiment of a piston pin 20T that includes the outer member 24 and a core 34T. The outer member 24 has the cavity 32 extending lengthwise therethrough and has the first volume V1 as discussed with respect to FIGS. 1 and 2. A core 34T is press-fit or otherwise inserted into the cavity 32. The core 34T includes multiple discrete core portions disposed adjacent to one another within the cavity 32. The multiple discrete core portions include a first core portion 34T1, a second core portion 34T2, a third core portion 34T3, a fourth core portion 34T4, and a fifth core portion 34T5 stacked in order lengthwise in the cavity 32 and each having an outer substantially cylindrical surface 35T1, 35T2, 35T3, 35T4, and 35T5 interfacing with the inner surface 37 of the cavity 32. The overall length of the core 34T is the length l2, which is less than the length l of the outer member 24.

The first core portion 34T1, the third core portion 34T3, and the fifth core portion 34T5 each have a respective generally central opening 44T1, 44T2, and 44T3 extending lengthwise therethrough and centered in the respective core portions, 34T1, 34T3 and 34T5 around the axis A of the outer member 24. The second and fourth core portions 34T2, 34T4 are solid, without any openings, and therefore separate the central openings 44T1, 44T2, and 44T3 from one another so that they are not open to one another. The outer surfaces 35T1 and 35T5 of the first core portion 34T1 and the fifth core portion 34T5 at outer ends 40T1 and 42T1 may have rounded edges E with radii from about 0.2 mm to about 3 mm to reduce stress concentrations in comparison to sharp, angled edges.

The solid second and fourth core portions 34T2, 34T4 are positioned generally to span along the axis A to bridge between the piston 12 and the connecting rod 18 (i.e., so that the edges of both the piston 12 and the connecting rod 18 fall directly radially outward of the second and fourth core portions 34T2, 34T4, the second and fourth core portions 34T2, 34T4 thereby providing support in the areas bearing the greatest loading, while weight reduction is achieved in other areas bearing less loading via the openings 44T1, 44T2, and 44T3.

Figures 25, 26:
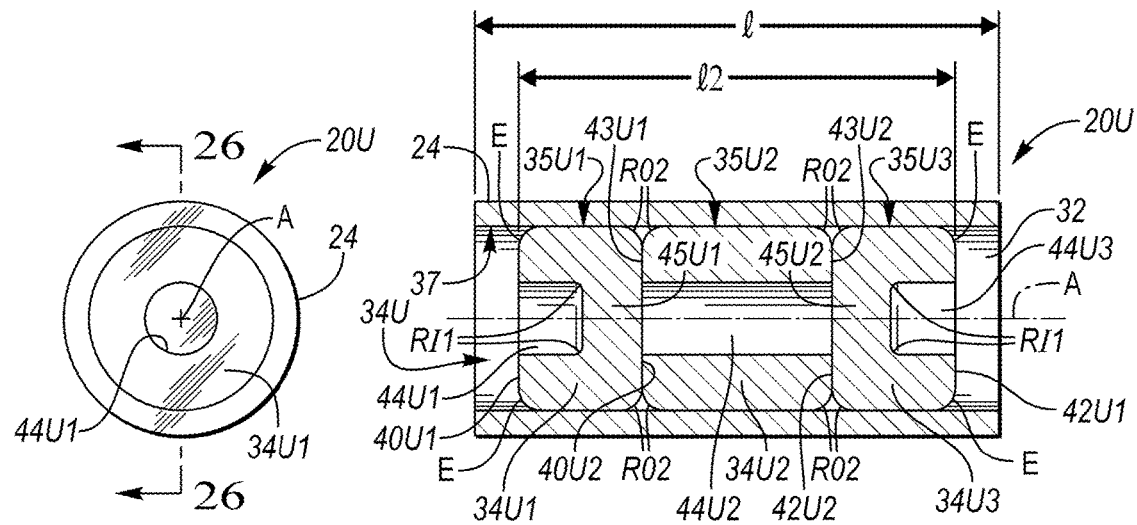
FIG. 25 is a schematic end view illustration of an alternative embodiment of a piston pin.
FIG. 26 is a schematic cross-sectional illustration of the piston pin of FIG. 25 taken at lines 26-26 in FIG. 25.

FIGS. 25 and 26 show an additional embodiment of a piston pin 20U that includes the outer member 24 and a core 34U. The outer member 24 has the cavity 32 extending lengthwise therethrough and has the first volume V1 as discussed with respect to FIGS. 1 and 2. The overall length of the core 34U is the length l2, which is less than the length l of the outer member 24. The core 34U is press-fit or otherwise inserted into the cavity 32. The core 34U includes multiple discrete core portions disposed adjacent to one another within the cavity 32. The multiple discrete core portions include a first core portion 34U1, a second core portion 34U2, and a third core portion 34U3 stacked in order lengthwise in the cavity 32 and each having an outer substantially cylindrical surface 35U1, 35U2, and 35U3 interfacing with the inner surface 37 of the cavity 32.

The first core portion 34U1 has a generally central opening 44U1 at an outer end 40U1 extending lengthwise only partially therethrough. The third core portion 34U3 also has a generally central opening 44U3 at an outer end 42U1 extending lengthwise only partially therethrough. The surfaces of the core portions 34U1 and 34U3 at the openings 44U1 and 44U3 may have an internal radius RI1 between axial extending portions and radially extending portions such as from about 0.5 mm to 5 mm to reduce stress concentrations in comparison to sharp, angled edges. The outer surfaces 35U1 and 35U3 of the first core portion 34U1 and the third core portion 34U3 at outer ends 40U1 and 42U1 may have rounded edges E with radii from about 0.2 mm to about 3 mm to reduce stress concentrations in comparison to sharp, angled edges. The inner surfaces 40U2 and 42U2 of the first and third core portions 34U1 and 34U3, and both end surfaces 43U1 and 43U2 of the second core portion 34U2 may have rounded edges RO2 with radii up to about 0.5 mm to reduce stress concentrations in comparison to sharp, angled edges.

The second core portion 34U2 has a generally central opening 44U2 that extends lengthwise therethrough. The openings 44U1, 44U2, and 44U3 extend lengthwise partially (i.e., openings 44U1 and 44U3) or completely (i.e., opening 44U2) therethrough and are centered in the respective core portions 34U1, 34U2, and 34U3 around the axis A of the outer member 24. The second core portion 34U2 may abut an inner end 40U2 of the first core portion 34U1 and an inner end 42U2 of the third core portion 34U3. Solid portions 45U1 and 45U2 of the first and third core portions 34U1, 34U3 (where the central openings 44U1 and 44U3 do not extend) are positioned generally to span along the axis A to bridge between the piston 12 and the connecting rod 18 (i.e., so that the edges of both the piston 12 and the connecting rod 18 fall directly radially outward of the solid portions 45U1 and 45U2, the solid portions 45U1 and 45U2 thereby providing support in the areas bearing the greatest loading, while weight reduction is achieved in other areas bearing less loading via the openings 44U1, 44U2, and 44U3.

Figures 27, 28:
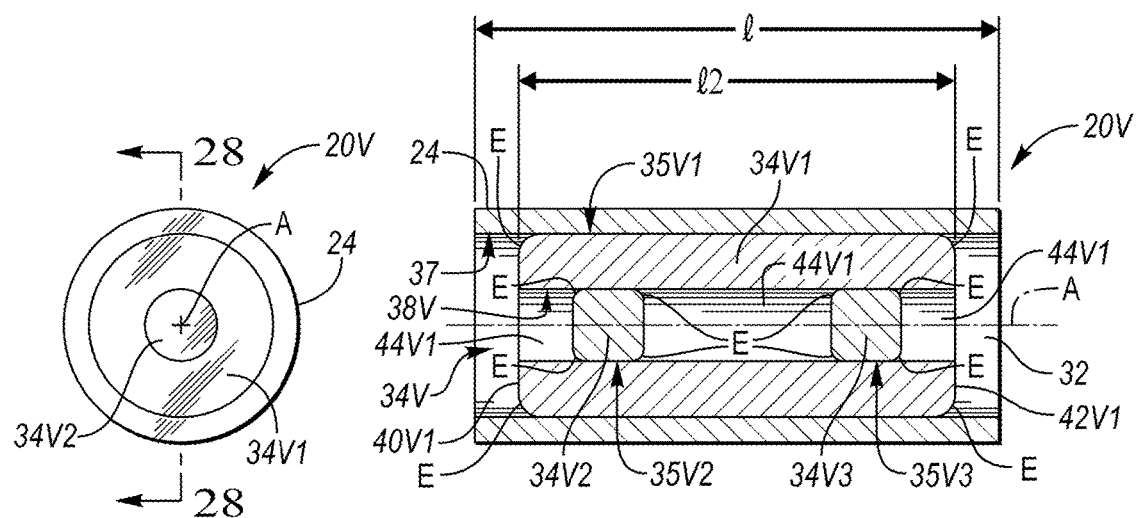
FIG. 27 is a schematic end view illustration of an alternative embodiment of a piston pin.
FIG. 28 is a schematic cross-sectional illustration of the piston pin of FIG. 27 taken at lines 28-28 in FIG. 27.

FIGS. 27 and 28 show an additional embodiment of a piston pin 20V that includes the outer member 24 and a multi-piece core 34V having multiple discrete core portions. The outer member 24 has the cavity 32 extending lengthwise therethrough and has the first volume V1 as discussed with respect to FIGS. 1 and 2. The overall length of the core 34V is the length l2, which is less than the length l of the outer member 24. The core 34V is press-fit or otherwise inserted into the cavity 32. The core 34V includes multiple discrete core portions disposed within the cavity 32. The multiple discrete core portions include a first core portion 34V1 with a generally cylindrical outer surface 35V1 interfacing with the inner surface 37 of the cavity 32. The first core portion 34V1 has a first opening 44V1 extending lengthwise therethrough. The first opening 44V1 extends lengthwise through the core portion 34V1 and is centered in the core portion 34V1 around the axis A of the outer member 24. A second core portion 34V2 and a third core portion 34V3 are positioned in the first opening 44V1 and are spaced apart from one another such that they are not in contact with one another. The second and third core portions 34V2, 34V3 may be referred to as plugs. Outer surfaces 35V2 and 35V3 of the second and third core portions 34V2 and 34V3 interface with an inner surface 38V of the first core portion 34V1 in the first opening 44V1. For example, the second and third core portions 34V2 and 34V3 may be press-fit into the first core portion 34V1, or the first core portion 34V1 can be shrink-fitted around the second and third core portions 34V2, 34V3. Still further, the second and third core portions 34V2 and 34V3 could each have a substantially central opening extending therethrough, with one or more additional plugs placed therein.

The outer surfaces 35V1, 35V2, and 35V3 of the first, second, and third core portions 34V1, 34V2, and 34V3 may have rounded edges E with radii from about 0.2 mm to about 3 mm to reduce stress concentrations in comparison to sharp, angled edges. Stresses are instead due only to pure compression stress of the piston pin 20V or due to bending of the outer member 24. The second and third core portions 34V2 and 34V3 are positioned generally to span along the axis A to bridge between the piston 12 and the connecting rod 18 (i.e., so that both the piston 12 and the connecting rod 18 fall directly radially outward of the second and third core portions 34V2 and 34V3, the second and third core portions 34V2 and 34V3 thereby providing support in the areas bearing the greatest loading, while weight reduction is achieved in other areas bearing less loading via the opening 44V1.

In various embodiments by way of non-limiting example, the first core portion 34V1 could be aluminum or titanium, and the second and third core portions 34V2 and 34V3 could be aluminum or titanium. For example, all of the core portions could be aluminum, all of the core portions could be titanium, the first core portion could be aluminum and the second and third core portions could be titanium, or the first core portion could be titanium and the second and third core portions could be aluminum.

The cores described herein may be a variety of materials, including but not limited to aluminum, carbon fiber, titanium, or steel or combinations of these materials. The outer member 24 may be a variety of materials, but is generally steel. Depending on the material used for the core, any of the piston pins 20-20V described herein may be manufactured by extruding the core, blowing the core from expanding metal foam, casting the core, sintering the core from powdered metal; or three-dimensional printing of the core. Any of the cores may be inserted in the outer member 24 by press-fitting or shrink-fitting. Alternatively, the outer member 24 may be heated to thermally expand and the core may then be inserted in the cavity 32, and the outer member 24 allowed to cool to fit to the core. Other suitable methods of insertion may be employed.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An assembly comprising:
a piston pin including:
an outer member having a cavity extending lengthwise therethrough; wherein the cavity has a first volume; and
a core fit to the outer member in the cavity; wherein the core has a second volume less than the first volume;
wherein the core at least partially defines a first opening extending lengthwise through at least a portion of the core;
wherein the cavity is cylindrical with an inner cylindrical surface;
wherein the core has an outer cylindrical surface fittable to the inner cylindrical surface of the outer member;
wherein the core at least partially defines a second opening extending lengthwise through the core; and
wherein the first opening and the second opening are the only openings in the core and are positioned in adjacent quadrants of the core.

2. The assembly of claim 1, in combination with a piston, wherein:
the piston has a pin bore;
the piston pin is fixed with respect to the piston in the pin bore such that the first opening and the second opening are positioned in a half of the core nearest a crown portion of the piston.

3. The assembly of claim 1, wherein:
the outer member has a first density; and
the core has a second density less than the first density.

4. The assembly of claim 1, wherein:
the outer member is steel; and
the core is any one of aluminum, carbon fiber, titanium, or steel.

5. An assembly comprising:
a piston pin including:
an outer member having a cavity extending lengthwise therethrough; wherein the cavity has a first volume; and
a core fit to the outer member in the cavity;
wherein the core has a second volume less than the first volume;
wherein the core includes multiple discrete core portions disposed adjacent to one another within the cavity;
wherein the cavity is generally cylindrical, and the multiple discrete core portions include a first, a second, a third, a fourth, and a fifth core portion stacked in order lengthwise in the cavity and each having an outer cylindrical surface interfacing with an inner surface of the cavity;
wherein the first, the third and the fifth core portions each have a generally central opening extending lengthwise therethrough; and
wherein the second and fourth core portions separate the central openings and block the central openings from one another.

6. The assembly of claim 5, wherein:
the outer member has a first density; and
the core has a second density less than the first density.

7. The assembly of claim 5, wherein the core has rounded edges at opposite ends of the core.

8. The assembly of claim 5, wherein:
the outer member has a first length;
the core has a second length less than the first length such that the outer member extends axially beyond the core at opposite ends of the core.

9. The assembly of claim 8, wherein a ratio of the second length to the first length is from about 0.4 to about 0.9.

10. The assembly of claim 5, wherein:
the outer member is steel; and
the core is any one of aluminum, carbon fiber, titanium, or steel.

11. An assembly comprising:
a piston pin including:
an outer member having a cavity extending lengthwise therethrough; wherein the cavity has a first volume; and
a core fit to the outer member in the cavity;
wherein the core has a second volume less than the first volume;
wherein the core includes multiple discrete core portions disposed adjacent to one another within the cavity;
wherein the cavity is generally cylindrical, and the multiple discrete core portions include a first, a second, and a third core portion stacked in order lengthwise in the cavity and each having an outer cylindrical surface interfacing with an inner surface of the cavity;
wherein the first core portion has a first opening at an outer end of the first core portion and extending partially therethrough;
wherein the second core portion has a generally central opening extending lengthwise therethrough; and
wherein the third core portion has a second opening at an outer end of the third core portion and extending partially therethrough.

12. The assembly of claim 11, wherein:
the outer member has a first density; and
the core has a second density less than the first density.

13. The assembly of claim 11, wherein the core has rounded edges at opposite ends of the core.

14. The assembly of claim 11, wherein:
the outer member has a first length;
the core has a second length less than the first length such that the outer member extends axially beyond the core at opposite ends of the core.

15. The assembly of claim 14, wherein a ratio of the second length to the first length is from about 0.4 to about 0.9.

16. The assembly of claim 11, wherein:
the outer member is steel; and
the core is any one of aluminum, carbon fiber, titanium, or steel.

17. An assembly comprising:
a piston pin including:
an outer member having a cavity extending lengthwise therethrough; wherein the cavity has a first volume; and
a core fit to the outer member in the cavity;
wherein the core has a second volume less than the first volume;
wherein the core includes multiple discrete core portions disposed adjacent to one another within the cavity;
wherein the cavity is generally cylindrical, and the multiple discrete core portions include:
a first core portion with a generally cylindrical outer surface interfacing with an inner surface of the cavity;
wherein the first core portion has a first opening extending lengthwise therethrough;
a second core portion positioned in the first opening of the first core portion; and
a third core portion positioned in the first opening of the first core portion and spaced apart from the second core portion.

18. The assembly of claim 17, wherein:
the outer member has a first density; and
the core has a second density less than the first density.

19. The assembly of claim 17, wherein the core has rounded edges at opposite ends of the core.

20. The assembly of claim 17, wherein:
the outer member has a first length;
the core has a second length less than the first length such that the outer member extends axially beyond the core at opposite ends of the core.

21. The assembly of claim 20, wherein a ratio of the second length to the first length is from about 0.4 to about 0.9.

22. The assembly of claim 17, wherein:
the outer member is steel; and
the core is any one of aluminum, carbon fiber, titanium, or steel.

* * * * *